United States Patent
Ma et al.

(10) Patent No.: US 9,754,379 B2
(45) Date of Patent: Sep. 5, 2017

(54) METHOD AND SYSTEM FOR DETERMINING PARAMETERS OF AN OFF-AXIS VIRTUAL CAMERA

(71) Applicant: BEIJING UNIVERSITY OF POSTS AND TELECOMMUNICATIONS, Beijing (CN)

(72) Inventors: Huadong Ma, Beijing (CN); Liang Liu, Beijing (CN); Aner Liu, Beijing (CN); Dawei Lu, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 15/012,442

(22) Filed: Feb. 1, 2016

(65) Prior Publication Data

US 2016/0337640 A1    Nov. 17, 2016

(30) Foreign Application Priority Data

May 15, 2015   (CN) .......................... 2015 1 0250453

(51) Int. Cl.
  *G06T 7/00*   (2017.01)
  *G06T 7/60*   (2017.01)
  (Continued)

(52) U.S. Cl.
  CPC ............ *G06T 7/0085* (2013.01); *G06T 7/13* (2017.01); *G06T 7/60* (2013.01); *H04N 13/0275* (2013.01); *H04N 13/0296* (2013.01)

(58) Field of Classification Search
  None
  See application file for complete search history.

(56) References Cited

U.S. PATENT DOCUMENTS 6,956,573 B1 * 10/2005 Bergen .............. G06F 17/30802
                                                              345/473
7,675,540 B2 * 3/2010 Matsumura ............. G06T 15/20
                                                              345/421

(Continued)

*Primary Examiner* — Said Broome
(74) *Attorney, Agent, or Firm* — Norton Rose Fulbright US LLP

(57) ABSTRACT

A method and a system for determining parameters of an off-axis virtual camera provided by embodiments of present invention can extract a scene depth map for each video frame from a depth buffer, determine the minimum value of edge depth values of the scene depth map as the closest scene edge depth of each video frame, determine the depth of a first object as the depth of an object of interest of each video frame, use the smaller value between the closest scene edge depth and the depth of an object of interest as the zero-parallax value and obtain a zero-parallax value sequence constituted by the zero-parallax value of each video frame. The present invention realizes automatic determination of the zero parallax of each video frame rather than manual setting thereof, and thus the determination will not be affected by factors such as lack of experience, and the amount of work for an technician is also reduced. Meanwhile, the present invention makes the zero parallax as close as possible to an object of interest without incurring the window occlusion problem, which can improve the stereo perception as much as possible while ensuring the comfortability, and can ensure the using effect of the determined zero parallax.

6 Claims, 8 Drawing Sheets

(51) Int. Cl.
*H04N 13/02* (2006.01)
*G06T 7/13* (2017.01)

(56) References Cited

U.S. PATENT DOCUMENTS

| | | | | |
|---|---|---|---|---|
| 2002/0118275 A1* | 8/2002 | Harman | ............... | H04N 13/026 348/51 |
| 2005/0147277 A1* | 7/2005 | Higaki | ............... | G06K 9/00362 382/103 |
| 2008/0246759 A1* | 10/2008 | Summers | .............. | G06F 3/0304 345/420 |

* cited by examiner

METHOD AND SYSTEM FOR DETERMINING PARAMETERS OF AN OFF-AXIS VIRTUAL CAMERA

CROSS-REFERENCE TO RELATED APPLICATIONS

This application claims the benefit of Chinese Application No. 201510250453.4, filed May 15, 2015. The contents of the referenced application are incorporated herein by reference.

TECHNICAL FIELD

The present invention relates to the technical field of three-dimensional (3D) animation production, and in particular relates to a method and a system for determining parameters of an off-axis virtual camera.

BACKGROUND

In recent years, with the prevalence of 3D animation film, 3D animation production technology has become a very important technology in film production.

The control over stereoscopic effect is particularly important in 3D animation production. Zero parallax is the distance between the middle point of the baseline of two cameras and the intersection point of the left and right cameras in the shooting direction, the value of which has a large influence on the stereoscopic visual effect. Once the zero parallax is determined, a better stereoscopic visual effect can be obtained by adjusting the off-axis virtual camera based on the zero parallax. Currently, the zero parallax is set manually and thus is likely to be affected by factors such as lack of experience, and the amount of work is huge since it is necessary to set the zero parallax for each video frame.

SUMMARY

An object of embodiments of the present invention is to provide a method and a system for determining parameters of an off-axis virtual camera, so that parameters of an off-axis virtual camera can be automatically determined.

To achieve the object mentioned above, embodiments of the present invention disclose a method for determining parameters of an off-axis virtual camera, the method is for applying in a computer and comprises:

extracting, from a depth buffer, a scene depth map for each video frame in the angle of view at the central point of the off-axis virtual camera;

for each video frame, determining the minimum value of edge depth values of the scene depth map of the video frame as the closest scene edge depth $Z_b$ of the video frame, and determining the depth of a first object of the video frame as the depth $Z_i$ of an object of interest of the video frame;

for each video frame, calculating the zero-parallax value $zp_o$ of the video frame by the equation of $$zp_o = \min(Z_b, Z_i),$$

and obtaining a zero-parallax value sequence constituted by the zero-parallax value $zp_o$ of each video frame.

Optionally, the method further comprises:

performing data smoothing processing to the zero-parallax value sequence and obtaining a zero-parallax final value sequence constituted by zero-parallax final value $zp$ of each video frame.

Optionally, the method further comprises:

for each video frame, determining the minimum depth value in the scene depth map of the video frame as the closest scene depth $Z_{min}$ of the video frame, and determining the maximum depth value in the scene depth map of the video frame as the furthest scene depth $Z_{max}$ of the video frame;

obtaining a pupillary distance pd, a viewing distance vd, the minimum value $\gamma_{min}$ of angle difference, and the maximum value $\gamma_{max}$ of angle difference, wherein the angle difference is the difference between a convergence angle and an adjustment angle;

calculating the maximum out-of-screen perceived distance $D_{neg}$ by the equation of $$D_{neg} = vd - \frac{pd}{2\tan\frac{\alpha - \gamma_{min}}{2}},$$

wherein, $$\alpha = 2\tan^{-1}\frac{pd}{2vd};$$

calculating the minimum out-of-screen perceived distance $D_{pos}$ by the equation of $$D_{pos} = \frac{pd}{2\tan\frac{\alpha - \gamma_{max}}{2}} - vd,$$

wherein, $$\alpha = 2\tan^{-1}\frac{pd}{2vd};$$

calculating the spacing s between cameras for each video frame by the equation of $$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{Z}\right)},$$

wherein, $\delta$ is the pixel width of a video display device, $W_s$ is the pixel width of a stereo image input by a user, and when $\rho_1 \leq \rho_2$ and $\rho_2 \geq 0$, $Z = Z_{min}$ and $D = D_{min}$; when $zp > Z_{max}$, $Z = Z_{min}$ and $D = D_{min}$; when $\rho_1 > \rho_2$ and $\rho_2 \geq 0$, $Z = Z_{max}$ and $D = D_{max}$; when $zp < Z_{min}$, $Z = Z_{max}$ and $D = D_{max}$, wherein, $$D_{max} = D_{pos} + vd$$

$$D_{min} = vd - D_{neg}$$

$$\rho_1 = \frac{D_{neg}}{D_{pos}}$$

$$\rho_2 = \frac{zp - Z_{min}}{Z_{max} - zp}$$

Optionally, the performing data smoothing processing to the zero-parallax value sequence and obtaining a zero-parallax final value sequence constituted by zero-parallax final value $zp$ of each video frame comprises:

performing data smoothing processing to the zero-parallax value sequence for a preset number of times with a seven-point linear smoothing algorithm, and obtaining the zero-parallax final value sequence constituted by the zero-parallax final value zp of each video frame.

Optionally, the method further comprises:

setting the parameters of the off-axis virtual camera according to the zero-parallax final value sequence and the spacing s between cameras for each video frame.

A system for determining parameters of an off-axis virtual camera is for applying in a computer and comprises: a depth map extracting unit, a first depth determining unit and a zero-parallax sequence obtaining unit, wherein the depth map extracting unit is used to extract, from a depth buffer, a scene depth map for each video frame in the angle of view at the central point of the off-axis virtual camera;

the first depth determining unit is used to, for each video frame, determine the minimum value of edge depth values of the scene depth map of the video frame as the closest scene edge depth $Z_b$ of the video frame, and to determine the depth of a first object of the video frame as the depth $Z_i$ of an object of interest of the video frame;

the zero-parallax sequence obtaining unit is used to, for each video frame, calculate the zero-parallax value $zp_o$ of the video frame by the equation of $$zp_o = \min(Z_b, Z_i),$$

and to obtain a zero-parallax value sequence constituted by the zero-parallax value $zp_o$ of each video frame.

Optionally, the system further comprises a smoothing processing unit, which is used to perform data smoothing processing to the zero-parallax value sequence obtained by the zero-parallax sequence obtaining unit, and to obtain a zero-parallax final value sequence constituted by zero-parallax final value zp of each video frame.

Optionally, the system further comprises a second depth determining unit, a parameter obtaining unit, a first distance calculating unit, a second distance calculating unit and a spacing calculating unit, wherein the second depth determining unit is used to, for each video frame, determine the minimum depth value in the scene depth map of the video frame as the closest scene depth $Z_{min}$ of the video frame and to determine the maximum depth value in the scene depth map of the video frame as the furthest scene depth $Z_{max}$ of the video frame; the parameter obtaining unit is used to obtain a pupillary distance pd, a viewing distance vd, the minimum value $\gamma_{min}$ of angle difference, and the maximum value $\gamma_{max}$ of angle difference, wherein the angle difference is the difference between a convergence angle and an adjustment angle;

the first distance calculating unit is used to calculate the maximum out-of-screen perceived distance $D_{neg}$ by the equation of $$D_{neg} = vd - \frac{pd}{2\tan\frac{\alpha - \gamma_{min}}{2}},$$

wherein, $$\alpha = 2\tan^{-1}\frac{pd}{2vd};$$

the second distance calculating unit is used to calculate the minimum out-of-screen perceived distance $D_{pos}$ by the equation of $$D_{pos} = \frac{pd}{2\tan\frac{\alpha - \gamma_{max}}{2}} - vd,$$

wherein, $$\alpha = 2\tan^{-1}\frac{pd}{2vd};$$

the spacing calculating unit is used to calculate the spacing s between cameras for each video frame by the equation of $$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{Z}\right)},$$

wherein, $\delta$ is the pixel width of a video display device, $W_s$ is the pixel width of a stereo image input by a user, and when $\rho_1 \leq \rho_2$ and $\rho_2 \geq 0$, $Z = Z_{min}$ and $D = D_{min}$; when $zp > Z_{max}$, $Z = Z_{min}$ and $D = D_{min}$; when $\rho_1 > \rho_2$ and $\rho_2 \geq 0$, $Z = Z_{max}$ and $D = D_{max}$; when $zp < Z_{min}$, $Z = Z_{max}$ and $D = D_{max}$, wherein, $$D_{max} = D_{pos} + vd$$

$$D_{min} = vd - D_{neg}$$

$$\rho_1 = \frac{D_{neg}}{D_{pos}}$$

$$\rho_2 = \frac{zp - Z_{min}}{Z_{max} - zp}$$

Optionally, the smoothing processing unit is particularly used to:

perform data smoothing processing to the zero-parallax value sequence for a preset number of times with a seven-point linear smoothing algorithm, and to obtain the zero-parallax final value sequence constituted by the zero-parallax final value zp of each video frame.

Optionally, the system further comprises a parameter setting unit, which is used to set the parameters of the off-axis virtual camera according to the zero-parallax final value sequence and the spacing s between cameras for each video frame.

The method and the system for determining parameters of an off-axis virtual camera provided by the embodiments of present invention can extract a scene depth map for each video frame in the angle of view at the central point of the off-axis virtual camera from a depth buffer; determine the minimum value of edge depth values of the scene depth map of each video frame as the closest scene edge depth $Z_b$ of each video frame; determine the depth of a first object of each video frame as the depth $Z_i$ of an object of interest of each video frame; use the smaller value between the closest scene edge depth $Z_b$ and the depth $Z_i$ of an object of interest as the zero-parallax value and obtain a zero-parallax value sequence constituted by the zero-parallax value $zp_o$ of each video frame. The present invention realizes automatic determination of the zero parallax for each video frame rather than manual setting thereof, and thus the determination will not be affected by factors such as lack of experience, and the amount of work for an technician is also reduced. Meanwhile, the present invention makes the zero parallax to be as close as possible to an object of interest without incurring the window occlusion problem, which can improve the stereo perception as much as possible while ensuring the comfortability, and can ensure the using effect of the determined zero parallax.

BRIEF DESCRIPTION OF THE DRAWINGS

In order to describe the technical solutions in the embodiments of the present invention or in the prior art more clearly, appended drawings required for describing the embodiments of the present invention or the prior art will be briefly described below. Obviously, the appended drawings described below are only some embodiments of the present invention, and those skilled in the art can obtain other drawings based on these drawings without doing creative works.

DETAILED DESCRIPTION

Technical solutions in the embodiments of the present invention will be described below clearly and completely in combination with the appended drawings of the embodiments of the present invention. Obviously, the described embodiments are only some of the embodiments of the present invention, rather than all of the embodiments. Any other embodiment obtained based on the embodiments of the present invention by those skilled in the art without doing creative works falls into the protection scope of the present invention.

Figure 1:
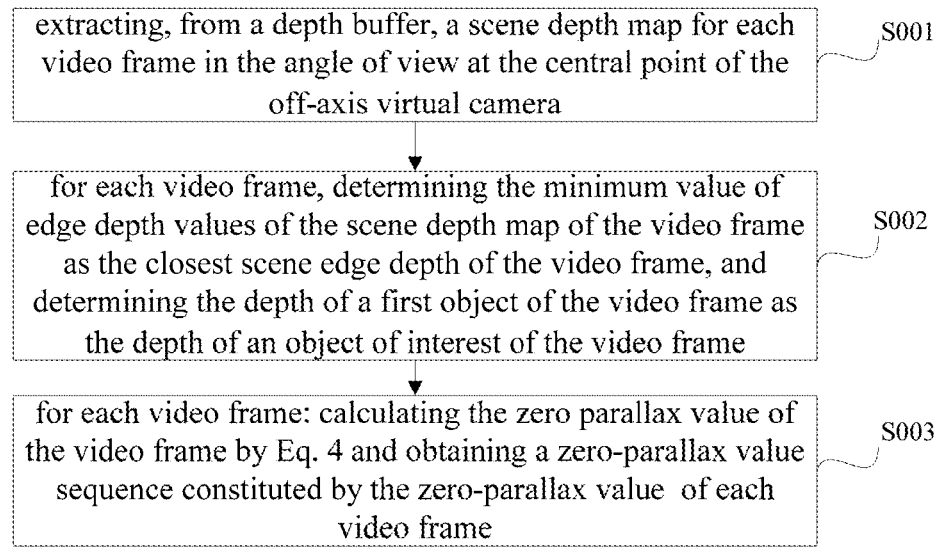
FIG. 1 is a flowchart of a method for determining parameters of an off-axis virtual camera provided by an embodiment of the present invention.
Figure 6:
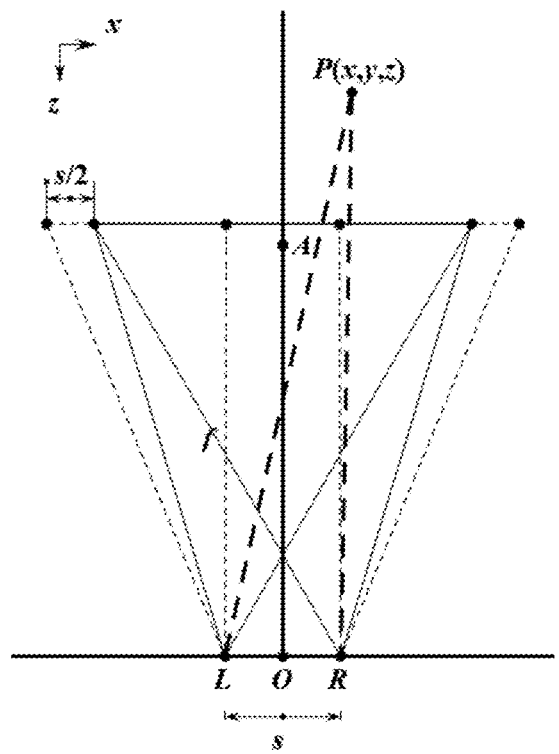
FIG. 6 is a schematic diagram of an off-axis model provided by an embodiment of the present invention.

As shown in FIG. 1, an embodiment of the present invention provides a method for determining parameters of an off-axis virtual camera, which is for applying in a computer and comprises:

S001, extracting, from a depth buffer, a scene depth map for each video frame in the angle of view at the central point of the off-axis virtual camera;

wherein the angle of view at the central point of the off-axis virtual camera refers to the angle of view at the middle point between a left camera and a right camera of the off-axis virtual camera, for example, the angle of view at the middle point O between a left camera L and a right camera R as seen in FIG. 6.

An object of stereo display is to overcome the constraints imposed by the two-dimensional (2D) image display and to present stereo space information for the audience. According to different principles, the stereo display technology can be classified into two main categories: parallax-based and non-parallax-based. The non-parallax-based stereo display technology including volumetric display technology, holographic projection etc., is often realized with the aid of special display medium and is mostly still in the experimental research stage.

The parallax-based stereo display technology, especially a binocular stereo display technology has been widely used currently. Firstly, a set of left and right cameras are used to obtain a pair of left-eye and right-eye images for the same scene; then the left and right eyes of a viewer can obtain respective images with the aid of a special device or method during the display. The method for distinguishing a stereo image pair mainly includes color difference method, polarization method, active stereo display technology and auto stereo display technology. The binocular stereo image pair stores parallax clues of the scene and is perceived as a stereo image by a fusion processing of the brain. The parallax in the binocular stereo display will be described below.

Assuming that the coordination of a certain point A in space is $A_l(x_l,y_l)$ in a left-eye image and is $A_r(x_r,y_r)$ in a right-eye image, the horizontal parallax and vertical parallax of the point A in a stereo image are respectively defined as:

$$P_h = x_r - x_l$$

$$P_v = y_r - y_l$$

Research has shown that only the horizontal parallax can create stereo perception and the vertical parallax does not contribute to the formation of the stereo perception.

Figure 2:
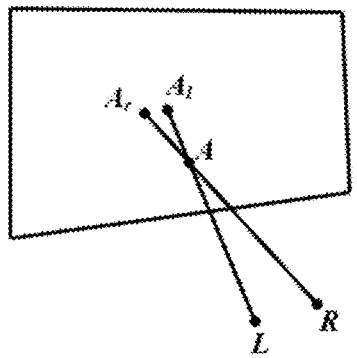
FIG. 2 is a schematic diagram of the parallax classification provided by an embodiment of the present invention.
Figure 3:
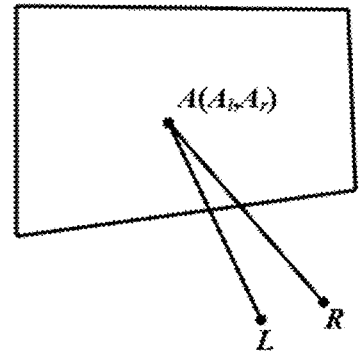
FIG. 3 is a schematic diagram of the parallax classification provided by an embodiment of the present invention.
Figure 4:
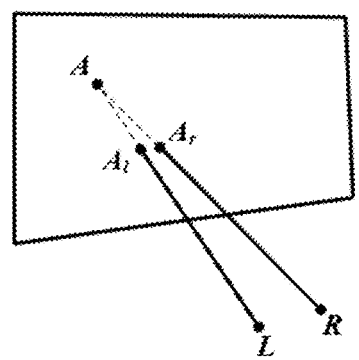
FIG. 4 is a schematic diagram of the parallax classification provided by an embodiment of the present invention.
Figure 5:
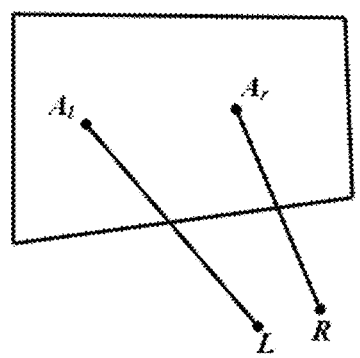
FIG. 5 is a schematic diagram of the parallax classification provided by an embodiment of the present invention.

Regarding the horizontal parallax $P_h$, there are generally four cases shown in FIG. 2 to FIG. 5:

As shown in FIG. 2, if $A_l$ is on the right side of $A_r$, then $P_h<0$, and the point A is perceived to be in front of the image plane, which is called a negative parallax;

As shown in FIG. 3, if $A_l$ coincides with $A_r$, then $P_h=0$ and the point A is perceived to be in the image plane, which is called a zero parallax;

As shown in FIG. 4, if $A_l$ is on the left side of $A_r$, then $P_h>0$ and the point A is perceived to be behind the image plane, which is called a positive parallax;

When A is perceived to be at infinity, visual lines of the left and right eyes are parallel, and then $P_h$ equals to the spacing between two eyes. If the separation of $A_l$ and $A_r$ continues to increase and the value of $P_h$ is increased, then the situation in FIG. 5 will occur, that is, there is no convergence point A directly in front of visual lines, which is called a divergent parallax. Human eyes are not capable of achieving visual fusion when the divergent parallax is formed, thus it must be avoided.

A stereo camera is normally constituted by a left eye camera and a right eye camera arranged in a certain way. It can be considered that the left and right eye cameras are obtained by a central camera through a pair of mirrored translation and rotation conversion. In this way, the optical characteristics of the left and right eye cameras are completely the same and only the relative bearing has been changed. According to different arrangement of the left and right eye cameras, a binocular stereo camera has three models: convergence model, parallel model and off-axis model.

In order to realize that a part of a scene is perceived to be in front of the screen and a part of it is perceived to be behind the screen, it is possible to perform translation movement for a stereo image. As shown in FIG. 4, the point A presents a positive parallax. If the left-eye image is moved in translation rightward and the right-eye image is moved in translation leftward, the perceived depth of the point A will gradually decrease and the effect in FIG. 2 will occur, i.e. a negative parallax will appear. The translation of an image is equivalent to the translation of a projection plane in an opposite direction. In order not to introduce a vertical parallax, primary optical axes of the left and right cameras remain parallel, but it differs from the parallel model in that the projection plane of cameras are moved in translation, i.e. the center of the projection plane is deviated from the primary optical axes. Therefore, such a binocular stereo camera model is called an off-axis model, as shown in FIG. 6.

In order not to introduce a vertical parallax, movements are only made in the horizontal direction. The projection plane of the left eye camera is moved in translation by s/2 towards the positive direction of x-axis and the projection plane of the right camera is moved in translation by s/2 towards the negative direction of x-axis, and then the projection planes of the two cameras completely coincide at the point z=-f. The calculation of the coordinate of the point P in the projection plane is equivalent to obtaining the coordinate in the parallel model, and then moving it in translation in the x direction.

Therefore, the equation for calculating the coordinate of a point in a right-eye projection plane is Eq. 1, which is:

$$[x_r, y_r] = \left[\frac{\frac{s}{2} - x}{z}f + \frac{s}{2}, \frac{y}{z}f\right]$$

The equation for calculating the coordinate of a point in a left-eye projection plane is Eq. 2, which is:

$$[x_l, y_l] = \left[\frac{-\frac{s}{2} - x}{z}f - \frac{s}{2}, \frac{y}{z}f\right]$$

Obviously, the vertical parallax remains zero. The horizontal parallax is calculated by Eq. 3, which is:

$$x_r - x_l = \left(1 + \frac{f}{z}\right)s = \left(1 - \frac{f}{|z|}\right)s$$

For a random point $|z|=f$, the horizontal parallax is constant at zero. Therefore, the plane $|z|=f$ is called a convergence plane, f is called a zero parallax. When $|z|<f$, the object locates in front of the convergence plane, the parallax is negative and the object is perceived to be in front of the screen; when $|z|>f$, the object locates behind the convergence plane, the parallax is positive and the object is perceived to be behind the screen.

The off-axis model, which can not only produce positive and negative parallax values but also avoid the horizontal parallax, is an ideal binocular stereo camera model. For a physical camera, it is necessary to use a special off-axis lens to realize the translation of the projection plane and the optical coefficients of left and right eye lenses are required to be identical; while for a virtual camera, what is needed is just to change the definition of the view frustum. This makes the off-axis model particularly suitable for filming a stereoscopic 3D animation. Therefore, off-axis virtual cameras are often used in the art for filming a stereoscopic 3D animation.

The difference between stereoscopic 3D animation and 2D animation is that the stereoscopic 3D animation has depth. When an object is drawn by a graphics processing unit (GPU), the depth (i.e. z-coordinate) of each pixel generated is stored in a buffer which is called a z buffer or a depth buffer (Z-Buffer).

For an image with a pixel width of W and a pixel height of H, its scene depth map is a data area with a size of W×H×K, wherein K is a depth bit length. The depth value $K_{ij}$ represents the depth information of the pixel with the coordinate of [i, j], wherein i∈[0, W−1], j∈[0, H−1]. In the present invention, the scene depth map is extracted from the depth buffer. Specifically, the scene depth map can be obtained in the depth buffer of GPU by drawing the scene of each video frame for once. No color information is needed during the drawing procedure mentioned above, and it is possible to completely disenable lighting and material to achieve a higher drawing speed.

S002, for each video frame, determining the minimum value of edge depth values of the scene depth map of the video frame as the closest scene edge depth $Z_b$ of the video frame, and determining the depth of a first object of the video frame as the depth $Z_i$ of an object of interest of the video frame.

Specifically, for each video frame: it is possible to obtain the closest scene edge depth $Z_b$ of the video frame by traversing four edges (i.e. top, bottom, left and right edges) of the scene depth map of the video frame.

Here, a first object can be an object of interest, such as a moving car. This first object can be designated by a user, or also can be automatically identified by a computer. For example, when a certain object located in the central area moves while the objects in surrounding areas do not, said object located in the central area is determined as the first object; when a certain object located in the central area does not move while the objects in surrounding areas do, said object located in the central area is also determined as the first object as well.

S003, for each video frame, calculating the zero-parallax value $zp_o$ of the video frame by Eq. 4, and obtaining a zero-parallax value sequence constituted by the zero-parallax value $zp_o$ of each video frame, wherein Eq. 4 is:

$$zp_o = \min(Z_b, Z_i)$$

Figure 7:
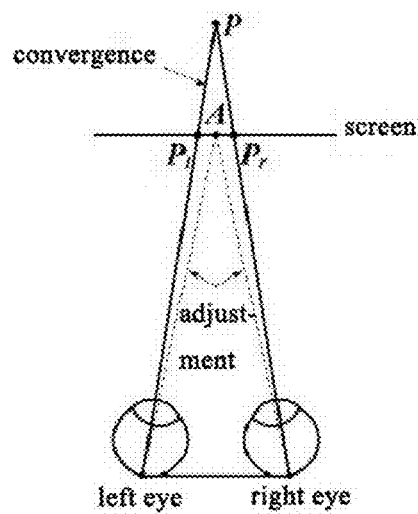
FIG. 7 is a schematic diagram of the convergence-adjustment conflict provided by an embodiment of the present invention.

When human eyes are watching a real object, the two eyes converge to a point on the object; meanwhile, in order to obtain a clear object image, the curvature of the crystalline lens is adjusted by eye muscles in such a way that the focal distance is the distance between the object and the eyes. At this time, the convergence point and the adjustment point are the same point, the distance between the convergence point and the eyes equals to the focal distance, which is called convergence-adjustment coincidence. This is not the case when watching stereoscopic content. As shown in FIG. 7, the image points of a certain point in the left eye image and in the right eye image are $P_l$ and $P_r$ respectively, and this point is perceived at the point P and the two eyes converge to the point P. However, at this time, a clear object image is on the screen, and the two eyes must be adjusted to converge to the point A on the screen so as to obtain a clear object image. At this time, the distance between the convergence point and the eyes is not equal to the focal distance, which is called convergence-adjustment conflict.

The convergence-adjustment conflict is one of the main differences between watching stereoscopic content and watching 2D content. Currently, the academic circle has commonly agreed that the convergence-adjustment conflict is one of the main reasons that cause the discomfort for viewers when watching stereoscopic content.

When a person is performing an observation action, it is necessary for the visual system and the brain to coordinate with each other, i.e. when two eyes converge to a certain object, the brain analyzes the image information on this object at the same time. If we are watching a certain object with the brain dealing with other information, visual lines will diverge unconsciously, which is so-called "stare blankly" or "distracted"; on the contrary, visual lines will even move to a certain object unconsciously when we want to obtain the information on this object. The area to which visual lines converge and on which the brain focuses when we are performing an observation action is called an area of interest.

In the application of interactive stereoscopic 3D animation, the immersive feeling of being physically present in the scene is achieved mainly through simulating the First-Person angle of view, and thus binocular stereo cameras should simulate the manner how human eyes observe an object. The convergence-adjustment conflict can be minimized by converging the stereo cameras to the center of the area of interest, which improves the comfortability and decreases the discomfort of users.

The convergence-adjustment conflict is essentially the conflict of stereoscopic watching experience and habitual watching experience. In a stereo display, there is a conflict between the depth clues in addition to the convergence-adjustment conflict.

Figure 8:
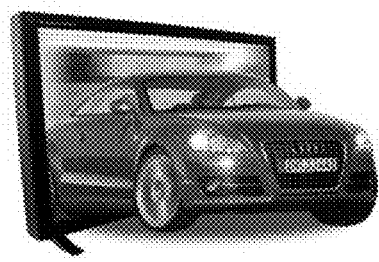
FIG. 8 is a schematic illustration of a stereo television advertisement provided by an embodiment of the present invention.

FIG. 8 is a stereo television advertisement commonly seen in the market, wherein the product is illustrated, by displaying that a certain object is moving across the screen, to be capable of producing stereoscopic sense. In fact, this effect cannot be realized since it is impossible for the images watched by viewers to exceed the pixel range of a screen and it is also impossible for the viewers to see a screen frame occluded by the image despite the angle of view. Regarding an object on the edge of an image, if the object presents a positive parallax, i.e. is perceived to be behind the screen, it is natural for a part of the object to be occluded because it corresponds to human eyes watching a scene through a "window" (the screen). However, if an object presents a negative parallax, i.e. is perceived to be in front of the screen, it will result in the conflict between parallax clues and non-parallax clues. Then the parallax clues tell the brain that the object is in front of the screen, whereas the non-parallax clues tell the brain that the object is behind the screen because a part of the image of the object beyond the screen range cannot be displayed, it seems that the object is occluded by the screen edge. Such conflict between depth clues is called a window occlusion problem.

Figure 9:
FIG. 9 is a schematic illustration of the information conflict caused by window occlusion problem, provided by an embodiment of the present invention.

Mendiburu's research has found that experience clues are stronger than parallax clues when the window occlusion problem occurs, as shown in FIG. 9, and the brain will "push" the object back into the screen or bend the screen towards viewers. Such image distortion caused by information conflict would cause visual fatigue and should be avoided as much as possible.

The window occlusion problem is essentially that the edge pixels have negative parallaxes, and then the idea to solve this problem is to eliminate the negative parallax for the edge pixels. A point whose depth value is smaller than the zero parallax always presents a negative parallax, thus it is necessary to require the zero parallaxes to be smaller than or equal to the depths of all the edge pixels. Therefore, adjusting the zero parallax to be the closest scene edge depth $Z_b$ can solve the window occlusion problem.

In conclusion, in order to decrease the convergence-adjustment conflict, the zero parallax should be put on the object of interest; in order to eliminate the window occlusion conflict, the zero parallax should be no larger than the closest scene edge depth $Z_b$.

The method for determining parameters of an off-axis virtual camera provided by the embodiments of present invention can extract a scene depth map for each video frame in the angle of view at the central point of the off-axis virtual camera from a depth buffer; determine the minimum value of edge depth values of the scene depth map of each video frame as the closest scene edge depth $Z_b$ of each video frame; determine the depth of a first object of each video frame as the depth $Z_i$ of an object of interest of each video frame, use the smaller value between the closest scene edge depth $Z_b$ and the depth $Z_i$ of an object of interest as zero-parallax value and obtain the zero-parallax value sequence constituted by the zero-parallax value $zp_o$ of each video frame. The present invention realizes automatic determination of the zero parallax for each video frame rather than manual setting thereof, and thus the determination will not be affected by factors such as lack of experience, and the amount of work for an technician is also reduced. Meanwhile, the present invention makes the zero parallax as close as possible to an object of interest without incurring the window occlusion problem, which can improve the stereo perception as much as possible while ensuring the comfortability, and can ensure the using effect of the determined zero parallax.

Figure 10:
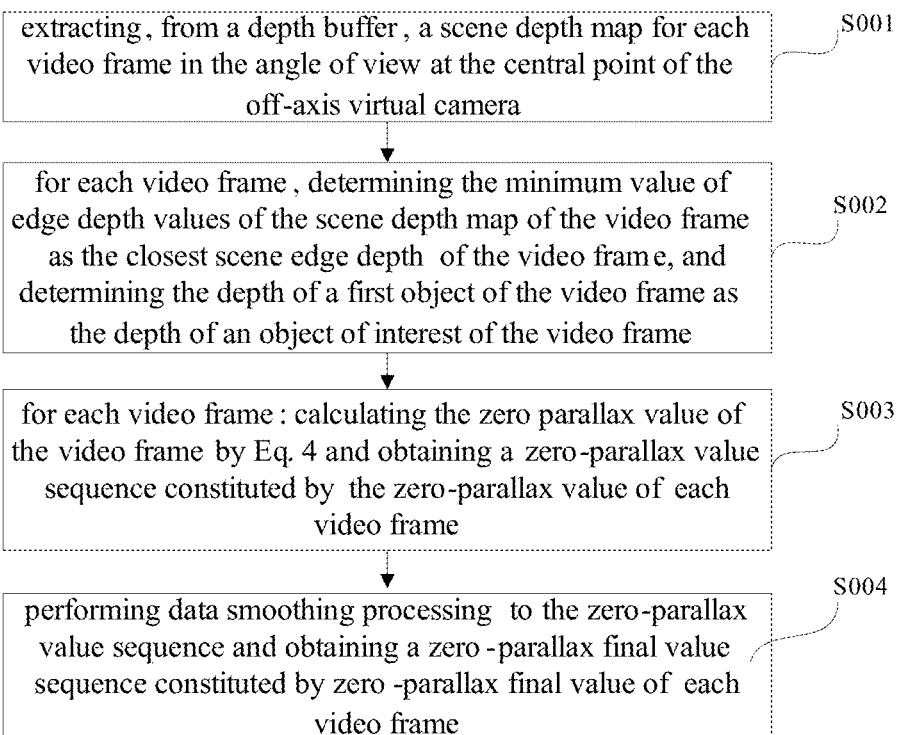
FIG. 10 is a flowchart of another method for determining parameters of an off-axis virtual camera provided by another embodiment of the present invention.

As shown in FIG. 10, another method for determining parameters of an off-axis virtual camera provided by an embodiment of the present invention can further comprise:

S004, performing data smoothing processing to the zero-parallax value sequence and obtaining a zero-parallax final value sequence constituted by zero-parallax final value zp of each video frame.

Here, S004 can particularly comprise performing the data smoothing processing to the zero-parallax value sequence for a preset number of times with a seven-point linear smoothing algorithm, and obtaining the zero-parallax final value sequence constituted by the zero-parallax final value zp of each video frame.

Here, the calculation equations for the seven-point linear smoothing algorithm can be Eq. 5, which are:

$$\begin{cases} y'_{i-3} = \frac{1}{28}(13y_{i-3} + 10y_{i-2} + 7y_{i-1} + 4y_i + y_{i+1} - 2y_{i+2} - 5y_{i+3}) \\ y'_{i-2} = \frac{1}{14}(5y_{i-3} + 4y_{i-2} + 3y_{i-1} + 2y_i + y_{i+1} - y_{i+3}) \\ y'_{i-1} = \frac{1}{28}(7y_{i-3} + 6y_{i-2} + 5y_{i-1} + 4y_i + 3y_{i+1} + 2y_{i+2} + y_{i+3}) \\ y'_i = \frac{1}{7}(y_{i-3} + y_{i-2} + y_{i-1} + y_i + y_{i+1} + y_{i+2} + y_{i+3}) \\ y'_{i+1} = \frac{1}{28}(y_{i-3} + 2y_{i-2} + 3y_{i-1} + 4y_i + 5y_{i+1} + 6y_{i+2} + 4y_{i+3}) \\ y'_{i+2} = \frac{1}{14}(-y_{i-3} + y_{i-1} + 2y_i + 3y_{i+1} + 4y_{i+2} + 5y_{i+3}) \\ y'_{i+3} = \frac{1}{28}(-5y_{i-3} - 2y_{i-2} + y_{i-1} + 4y_i + 7y_{i+1} + 10y_{i+2} + 13y_{i+3}) \end{cases}$$

The seven-point linear smoothing algorithm will be described below:

assuming that smoothing is performed for m data: for the first three smoothing values: $y'_0$, $y'_1$ and $y'_2$, the smoothing values are calculated with i=3; for the last three smoothing values: $y'_{m-3}$, $y'_{m-2}$ and $y'_{m-1}$, the smoothing values are calculated with i=m-4; for any i∈[3, m-4], the smoothing value $y'_i$ is actually the linear average value of the seven data points centered on $y_i$.

Of course, in other embodiments of the present invention, data smoothing processing can also be performed with a three-point linear smoothing algorithm, five-point linear smoothing algorithm or eleven-point linear smoothing algorithm etc.

In real life, people are accustomed to an object whose depth is constant when observing it for a long period of time. That is because if the object depth keeps changing, human eyes must frequently change the convergence and adjustment, which would lead to the fatigue of eye muscles. Although the binocular convergence point can also change when people watching planar contents, it normally concentrate only on the area near the screen center and is always in the same plane, so the change amplitude is relatively small, which is not likely to cause fatigue. Eyes will converge to the perceived depth of an object when watching stereoscopic contents, that is to say, if the object changes within a relatively large depth range, eyes also need to perform further convergence variation, which is likely to cause visual fatigue. Meanwhile, the convergence and adjustment of human eyes need time. It takes time for human eyes to clearly see an object when switching between different objects, and then to perceive the depth of the object. If the depth of an object changes a lot between two frames and the image switch happens before there is enough time for the brain to analyze the object depth, then not only the 3D effect is largely decreases but also may cause giddiness and nausea. In stereo display, the problem that the depth changes too fast and too largely is called depth jumping problem.

The embodiment shown in FIG. 10 can achieve a smoother depth change by performing the data smoothing processing to the zero-parallax value sequence, which avoids the depth jumping problem. The 3D stereoscopic animation filmed with the zero-parallax final values in the zero-parallax final value sequence obtained in the embodiment shown in FIG. 10 provides better view feeling for users.

Binocular stereo display realizes a stereoscopic feeling by means of parallax. In early 3D films, filmmakers often produced exaggerated visual effects (e.g., a bullet or a baseball flying towards human faces) by creating a huge parallax, the purpose of which is to show visual impacts that the new technology of stereo display can bring about. But, in fact these films may bring discomfort to audiences, including nausea, giddiness, headache, eye fatigue etc., This results in the stereo display technology being considered lack of practicability and abandoned for quite a long time.

With the development and maturity of stereo display technology, people have realized that stereo display may also introduce new problems although it can achieve effects that traditional 2D display cannot achieve. The comfortability of stereo display should also be ensured while a real stereoscopic sense is realized. One of the issues that affect the comfortability of stereo display is stereo contents per se.

It can be known from the description of convergence-adjustment conflict in the embodiments mentioned above, that the larger the convergence-adjustment conflict is, the worse the comfortability of a stereo display is. We always adjust our eyes to the screen when watching stereo contents. The further the perceived depth of an object from a screen is, the further the convergence point from the screen is and the greater the convergence-adjustment conflict is. Correspondingly, the comfortability of a stereo display is worse. Human eyes have certain toleration to the convergence-adjustment conflict. A perceived depth interval that does not cause the convergence-adjustment conflict to go beyond the range acceptable by human eyes is called a stereo display comfort interval, which is called comfort interval for short.

Figure 12:
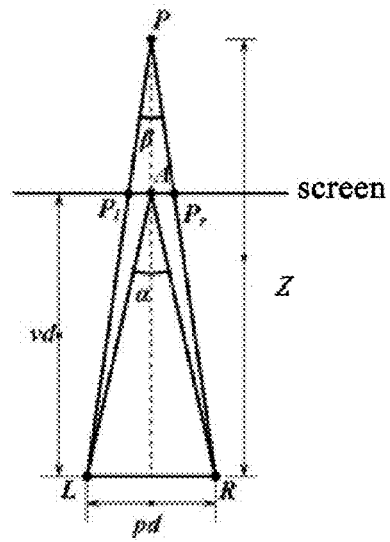
FIG. 12 is a schematic diagram of a stereo display comfort interval provided by an embodiment of the present invention.

The comfort zone will be analyzed below in combination of the convergence-adjustment conflict. As shown in FIG. 12, assuming that the perpendicular bisector of the line connecting left eye L and right eye R intersects the screen at point A, the image points of an object in the stereo image pair are $P_l$ and $P_r$ respectively, and the two points are symmetric with respect to the point A, this point A is perceived at the point P. In this case, eyes are adjusted to A and converge to P, α is called the adjustment angle and β is called the convergence angle.

It can be seen that the larger the difference between α and β is, the further point P from the screen is and the severer the convergence-adjustment conflict is. γ=α−β is defined as convergence-adjustment angle difference. It should be emphasized that for a fixed α, the points with the same convergence-adjustment angle difference constitute a circle passing through three points L, R and P, and at this time distances between them and the screen are not equal. However, the angle β is used to approximatively represent the convergence angles of all the points in the depth plane where the point P is located since angle β is normally very small. In the same way, the adjustment angle α at the point A is used as the adjustment angle under the current viewing condition.

Assuming that the pupillary distance of human eyes is pd, and the viewing distance is vd, the perceived depth D of the point P is obtained by Eq. 6, which is:

$$D = \frac{pd}{2\tan\frac{\beta}{2}} = \frac{pd}{2\tan\frac{\alpha-\gamma}{2}},$$

wherein, $$\alpha = 2\tan^{-1}\frac{pd}{2vd}.$$

It can be known from Eq. 6 that one γ value corresponds to one perceived depth value. If the range of the convergence-adjustment angle difference is defined, the perceived depth range is also defined. Assuming that the convergence-adjustment angle difference bearable by human eyes is $\gamma \in [\gamma_{min}, \gamma_{max}]$, the following equation can be obtained:

$$\beta \in [\beta_{min}, \beta_{max}] = [\alpha - \gamma_{max}, \alpha - \gamma_{min}] \quad \text{Eq. 7}$$

$$D \in [D_{min}, D_{max}] = \left[ \frac{pd}{2\tan\frac{\alpha-\gamma_{min}}{2}}, \frac{pd}{2\tan\frac{\alpha-\gamma_{max}}{2}} \right] \quad \text{Eq. 8}$$

wherein, $[D_{min}, D_{max}]$ is a comfort interval defined by $\gamma$. Normally the comfort interval is distributed on both sides of a screen, i.e.

$$D_{min} < vd < D_{max}$$

Figure 13:
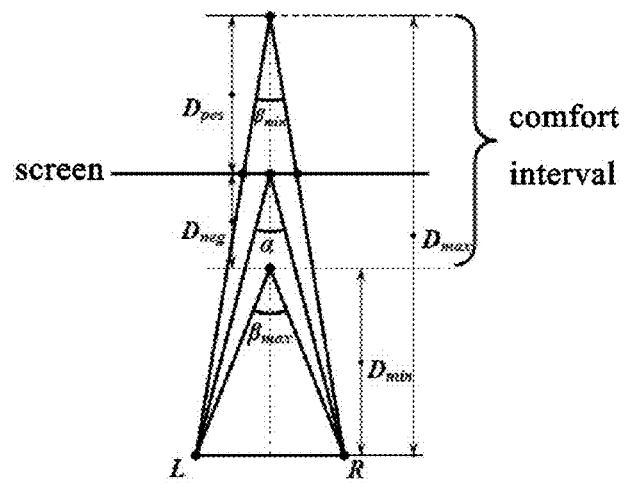
FIG. 13 is a schematic diagram of a stereo display comfort interval provided by an embodiment of the present invention.

Therefore, the comfort interval can be expressed in another form as shown in Eq. 9:

$$D_{neg} = vd - D_{min}, D_{pos} = D_{max} - vd \quad \text{Eq. 9}$$

wherein, $D_{neg}$ is the maximum out-of-screen perceived distance, which is also the maximum distance of the comfort interval in front of an screen; $D_{pos}$ is the minimum out-of-screen perceived distance, which is also the maximum distance of the comfort interval behind an screen. In this case, the comfort interval can be considered as a space centered on the screen and the largest distance to the screen from the front and from behind are $D_{neg}$ and $D_{pos}$ respectively, which is also a most commonly used manner to define comfort interval, as shown in FIG. 13.

Currently, quantitative studies on the comfort interval are carried out mainly by means of subjective evaluation experiments, and the conclusions of various experiments are not exactly the same. For example, the comfort interval in front of a screen is 25% of a viewing distance, the comfort interval behind a screen is 60% of the viewing distance; the comfort intervals in front of a screen and behind a screen are 107 mm and 145 mm respectively; the comfort interval in front of a screen falls between 50 mm and 190 mm, and the comfort interval behind a screen falls between 60 mm and 180 mm.

Figure 14:
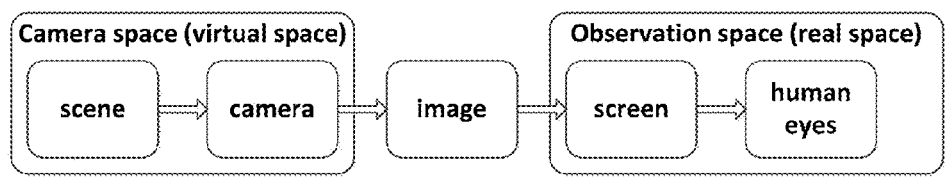
FIG. 14 is a schematic diagram of information transfer from virtual space to display space provided by an embodiment of the present invention.

There is an information transfer process from the generation of stereo images to the viewing of audiences as shown in FIG. 14. The space constituted by a scene and a camera is called a camera space; the space constituted by a screen and human eyes is called observation space. There is a corresponding relationship between the two spaces, i.e., the zero parallax in the scene corresponds to the screen and the camera corresponds to human eyes. Then a point of a depth in the scene should correspond to a point of a certain perceived depth in the real space as well. This corresponding relationship is called perceived depth mapping. For an already defined virtual scene, an obtained stereo image and thus the stereo display effect are determined by the parameters of the camera. The relationship models between the parameters of a stereo camera and the stereoscopic effect (i.e. the perceived depth mapping relationship) will be described in detail below.

Firstly, it is known from Eq. 3 that the calculation equation for parallax in an off-axis model is Eq. 10, which is:

$$P_p = \left(1 - \frac{zp}{Z}\right)s$$

wherein, zp is the zero parallax, s is the spacing between cameras, Z is the distance of a certain point from the cameras, and then $P_p$ is the parallax of this point in a projection plane.

Assuming that the angle of view of a central camera is $\alpha$, the equation for calculating the width $W_p$ of the projection plane is Eq. 11, which is:

$$W_p = 2 \cdot zp \cdot \tan\frac{\alpha}{2}$$

$P_p$ and $W_p$ both use the length unit in a virtual space. An image in the projection plane corresponds to an image with a width of $W_s$ on the screen, so the equation for calculating the parallax $P_s$ of this point on the screen whose unit is pixel is Eq. 12, which is:

$$P_s = \frac{W_s}{W_p} P_p.$$

Assuming that the spacing between screen pixels is $\sigma$ mm/pixel, the equation for calculating the final parallax P, with a unit of mm, of this point on the screen is Eq. 13, which is:

$$P = P_s \cdot \sigma$$

This representation method by parallax is not direct enough, and thus we can convert it into the perceived depth D. Assuming that the pupillary distance of human eyes is pd, the viewing distance is vd, as shown in FIG. 12, Eq. 14 can be obtained from similar triangles and is:

$$D = \frac{pd}{pd - P} \cdot vd$$

with a unit of mm. The mapping relationship f as Eq. 15 from a scene depth Z to a perceived depth D is established by substituting Eq. 13 into Eq. 14, and Eq. 15 is:

$$D = f(Z)$$

f is called a perceived depth mapping relationship.

The coefficients in f are divided into two parts: zero parallax zp and the spacing s between cameras are called stereo coefficients and other coefficients are all called environmental coefficients. The environmental coefficients are normally preset, and then a set of stereo coefficients uniquely determine one mapping relationship, that is to say, at this time the parameters of a stereo camera determine 3D effect of a stereo image. On the contrary, the required parameters of a camera can be deduced according to the mapping relationship based on the 3D effect that we wish to obtain.

There are two coefficients to be determined, thus a set of the mapping relationships need to be defined as shown in Eq. 16, which is:

$$\begin{cases} D_{min} = f(Z_{min}) \\ D_{max} = f(Z_{max}) \end{cases}$$

Because f is a proportional mapping, for any $Z \in [Z_{min}, Z_{max}]$, then $D \in [D_{min}, D_{max}]$. That is, we actually selected a virtual scene depth interval and a perceived depth interval, and the former is mapped proportionally into the latter. The way to select intervals is called a mapping strategy.

It is known from the description above that there is a comfort interval in stereo display, which is defined by the perceived depth interval. One accessible mapping strategy is to map a certain scene depth interval into the whole comfort interval, then a better 3D perception is obtained while ensuring comfortability.

The main idea of the existing perceived depth mapping strategy is to take full advantage of the comfort space inside the stereo comfort interval. To this end, a proportion-relationship (1) needs to be true, the proportion relationship (1) being:

$$\frac{\text{a comfort interval range in front of a screen}}{\text{a comfort interval range behind a screen}} =$$

$$\frac{\text{range from convergence plane to the closest scene depth}}{\text{range from convergence plane to the furthest scene depth}}$$

When the comfort interval range is determined, this proportion relationship determines the position of a convergence plane in the scene. That is, the two parameters, i.e. the zero parallax and the spacing between cameras, are both determined by the perceived depth mapping relationship.

Meanwhile, the window occlusion problem is considered. The window occlusion problem is essentially that the edge pixels have negative parallaxes, and then the idea to solve this problem is to eliminate the negative parallaxes for the edge pixels. A point whose depth value is smaller than the zero parallax always presents a negative parallax, so it is necessary to require the zero parallax to be smaller than or equal to the depths of all the edge pixels. It can be seen that the window occlusion problem can be solved by adjusting the zero parallax.

Eyes will be focused on areas of interest when people are observing real scenes, and this is also the case when watching 3D animations. An observer staring at an area of interest means that human eyes converge to the center of the area of interest, i.e., the perceived depth of the area of interest will determine the extent of the convergence-adjustment conflict. If the convergence plane is always put in the center of an area of interest, then it means that observers can always obtain a relatively small convergence-adjustment difference during the whole observation, which can theoretically achieve better comfortability. During an animation creation process, the area of interest is mainly directly designated by the creator. Meanwhile, the window occlusion problem is considered. The window occlusion problem is essentially that the edge pixels have negative parallaxes, and then the idea to solve this problem is to eliminate the negative parallaxes for the edge pixels. A point whose depth value is smaller than the zero parallax always presents a negative parallax, so it is necessary to require the zero parallax to be smaller than or equal to the depths of all the edge pixels.

In conclusion, the present invention presents a zero-parallax adjustment strategy, the basic concept of which is to make the zero parallax as close as possible to an area of interest without incurring the window occlusion problem. This strategy avoids the window occlusion problem and ensures an optimized distribution of comfort to some extent.

The spacing between cameras can be calculated after calculating the comfort interval and the zero parallax. The Eq. 17 for calculating the spacing between cameras can be deduced from Eq. 14, which is:

$$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{z}\right)}$$

It can be seen from Eq. 17 that after the zero parallax zp is determined, the mapping from Z to D determines the spacing between cameras, i.e.

$$s = g(Z, D)$$

So what we only need to do is to select a mapping relationship.

When selecting a mapping relationship, we should make the virtual space after mapping to cover the comfort interval space as much as possible in order to decrease the loss of stereo feeling. The method is as follows:

The perceived depth mapping is a proportional mapping. Assuming that there is a proportion relationship $\rho_1$ and $\rho_2$:

$$\rho_1 = \frac{D_{neg}}{D_{pos}}$$

$$\rho_2 = \frac{zp - Z_{min}}{Z_{max} - zp}$$

wherein, $Z_{min}$ and $Z_{max}$ are the closest depth of a pixel and the furthest depth of a pixel respectively. Compare the values of $\rho_1$ and that of $\rho_2$, and:

(1) If $\rho_1 < \rho_2$, then in order to take advantage of the comfort interval as much as possible without exceeding the comfort interval, the closest depth $Z_{min}$ of a pixel is selected to be mapped into $D_{neg}$, which is called a negative parallax alignment mapping. In this case, a part of the comfort interval behind the screen is not utilized. One extreme case is $zp = Z_{max}$, and the same mapping method is utilized.

(2) If $\rho_1 = \rho_2$, then the comfort interval happens to be taken into full advantage of, which is called a full parallax mapping.

(3) If $\rho_1 > \rho_2$, then $Z_{max}$ is mapped into $D_{pos}$, which is called a positive parallax alignment mapping. In this case, a part of the comfort interval in front of the screen is not utilized. This is also the case for $zp = Z_{min}$.

(4) $\rho_2 \geq 0$ in all the three cases above. However, $\rho_2 < 0$ may happen because of the introduction of zero-parallax smoothing. In this case, $zp > Z_{max}$, and the scenes are all perceived to be in front of the screen with the negative parallax alignment mapping. Similarly, the positive parallax alignment mapping is used if $zp < Z_{min}$.

After determining the mapping relationship, the spacing s between cameras can be calculated by Eq. 18, which are:

$$s = \begin{cases} g(D_{min}, Z_{min}) \rho_1 \leq \rho_2 \text{ and } \rho_2 \geq 0, \text{ or } zp > Z_{max} \\ g(D_{max}, Z_{max}) \rho_1 > \rho_2 \text{ and } \rho_2 \geq 0, \text{ or } zp < Z_{min} \end{cases},$$

and then the spacing between cameras can be calculated.

Figure 11:
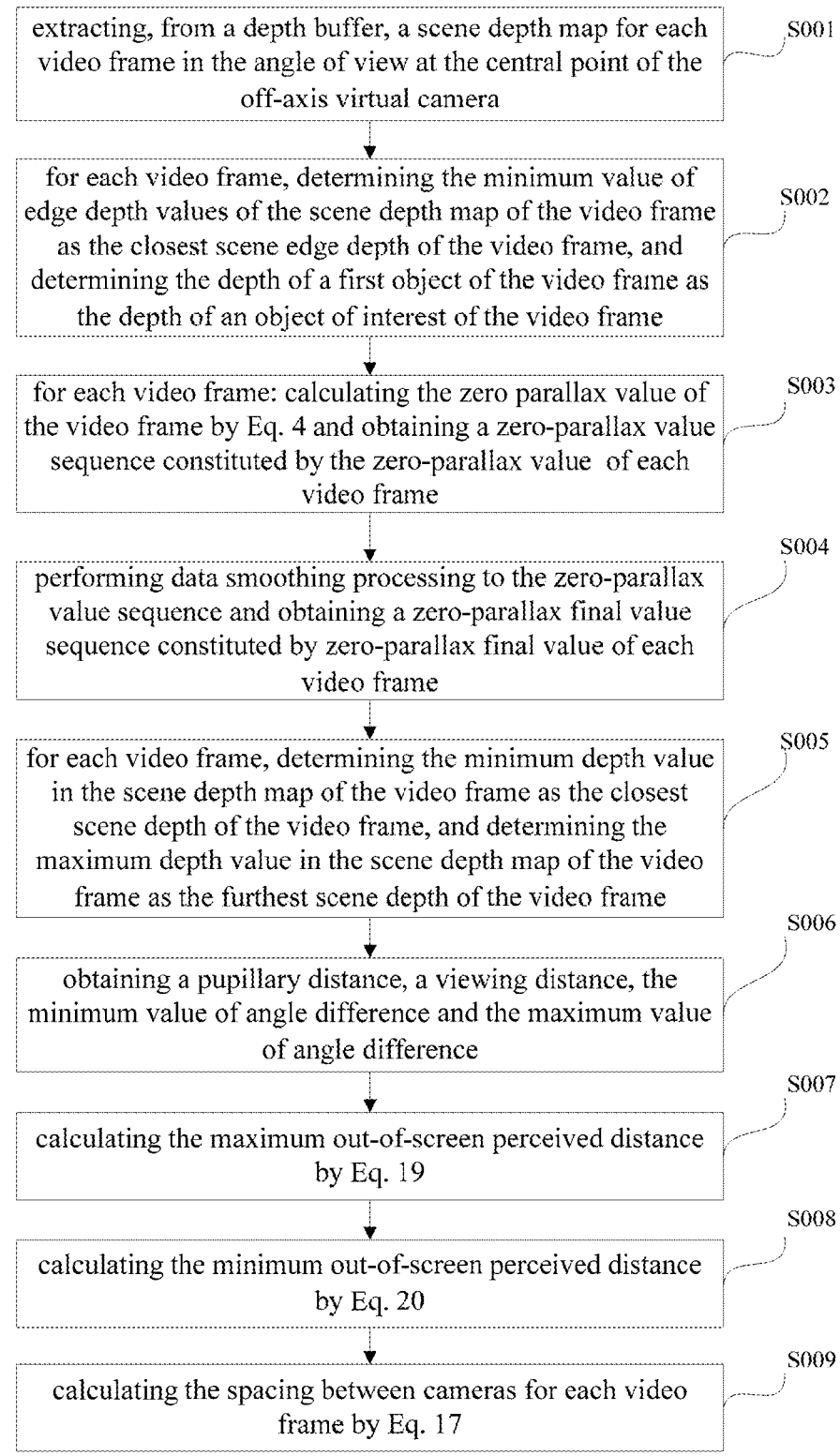
FIG. 11 is a flowchart of another method for determining the parameters of an off-axis virtual camera provided by another embodiment of the present invention.

Based on the embodiment shown in FIG. 10, another method for determining parameters of an off-axis virtual camera provided by an embodiment of the present invention as shown in FIG. 11 can further comprise the following steps:

S005, for each video frame, determining the minimum depth value in the scene depth map of the video frame as the closest scene depth $Z_{min}$ of the video frame, and determining the maximum depth value in the scene depth map of the video frame as the furthest scene depth $Z_{max}$ of the video frame.

S006, obtaining a pupillary distance pd, a viewing distance vd, the minimum value $\gamma_{min}$ of angle difference, and the maximum value $\gamma_{max}$ of angle difference, wherein the angle difference is the difference between a convergence angle and an adjustment angle.

S007, calculating the maximum out-of-screen perceived distance $D_{neg}$ according to Eq. 19, which is:

$$D_{neg} = vd - \frac{pd}{2\tan\frac{\alpha - \gamma_{min}}{2}}$$

wherein, $$\alpha = 2\tan^{-1}\frac{pd}{2vd}.$$

S008, calculating the minimum out-of-screen perceived distance $D_{pos}$ according to Eq. 20, which is:

$$D_{pos} = \frac{pd}{2\tan\frac{\alpha - \gamma_{max}}{2}} - vd$$

wherein, $$\alpha = 2\tan^{-1}\frac{pd}{2vd}.$$

Here, the execution sequence between step S005 and steps S002 to S004 can be random; the execution sequence between steps S006 to S008 and steps S001 to S004 can be random; the execution sequence between steps S006 to S008 and step S005 can be random; and the execution sequence between step S007 and step S008 can be random.

S009, calculating the spacing s between cameras for each video frame by Eq. 17, which is:

$$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{z}\right)}$$

wherein, $\delta$ is the pixel width of a video display device, $W_s$ is the pixel width of a stereo image input by a user. When $\rho_1 \leq \rho_2$ and $\rho_2 \geq 0$, $Z = Z_{min}$ and $D = D_{min}$; when $zp > Z_{max}$, $Z = Z_{min}$ and $D = D_{min}$; when $\rho_1 > \rho_2$ and $\rho_2 \geq 0$, $Z = Z_{max}$ and $D = D_{max}$; when $zp < Z_{min}$, $Z = Z_{max}$ and $D = D_{max}$, wherein, $$D_{max} = D_{pos} + vd$$

$$D_{min} = vd - D_{neg}$$

$$\rho_1 = \frac{D_{neg}}{D_{pos}}$$

$$\rho_2 = \frac{zp - Z_{min}}{Z_{max} - zp}.$$

Because the equations for calculating the spacing between cameras in the embodiment as shown in FIG. 11 are obtained according to the mapping relationship of the stereo display comfort interval and the perceived depth, the spacing between cameras calculated according to the embodiment as shown in FIG. 11 can allow the scene depth within the comfort interval so that the users can obtain a relatively comfortable watching feeling.

Based on the embodiment as shown in FIG. 11, another method for calculating parameters of an off-axis virtual camera provided by an embodiment of the present invention can further comprise:

setting the parameters of the off-axis virtual camera according to the zero-parallax final value sequence and the spacing s between cameras for each video frame.

Corresponding to the method mentioned above, the present invention also provides a system for determining parameters of an off-axis virtual camera.

Figure 15:
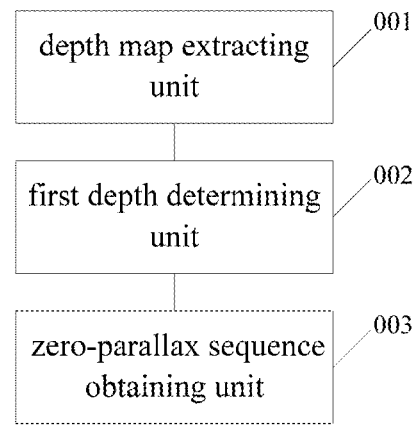
FIG. 15 is a structural schematic illustration of a system for determining parameters of an off-axis virtual camera provided by an embodiment of the present invention.

As shown in FIG. 15, the present invention also provides a system for determining parameters of an off-axis virtual camera, which is for applying in a computer and can comprise a depth map extracting unit 001, a first depth determining unit 002 and a zero-parallax sequence obtaining unit 003, the depth map extracting unit 001 is used to extract, from depth buffer, a scene depth map for each video frame in the angle of view at the central point of the off-axis virtual camera;

the first depth determining unit 002 is used to, for each video frame, determine the minimum value of edge depth values of the scene depth map of the video frame as the closest scene edge depth $Z_b$ of the video frame and to determine the depth of a first object of the video frame as the depth $Z_i$ of an object of interest of the video frame;

the zero-parallax sequence obtaining unit 003 is used to, for each video frame, calculate the zero-parallax value $zp_o$ of the video frame by the following equation:

$$zp_o = \min(Z_b, Z_i)$$

and to obtain a zero-parallax value sequence constituted by the zero-parallax value $zp_o$ of each video frame.

A system for determining parameters of an off-axis virtual camera provided by an embodiment of present invention can extract a scene depth map for each video frame in the angle of view at the central point of the off-axis virtual camera from the depth buffer; determine the minimum value of edge depth values of the scene depth map of each video frame as the closest scene edge depth $Z_b$ of each video frame; determine the depth of a first object of each video frame as the depth $Z_i$ of an object of interest of each video frame; use the smaller value between the closest scene edge depth $Z_b$ and the depth $Z_i$ of an object of interest as the zero-parallax value and obtain a zero-parallax value sequence constituted by the zero-parallax value $zp_o$ of each video frame. The present invention realizes the automatic determination of the zero parallax of each video frame rather than manual setting thereof, and thus the determination will not be affected by factors such as lack of experience, and the amount of work for an technician is also reduced. Meanwhile, the present invention makes zero parallax as close as possible to an object of interest without incurring the window occlusion problem, which can improve the stereo perception as much as possible while ensuring the comfortability and can ensure the using effect of the determined zero parallax.

Figure 16:
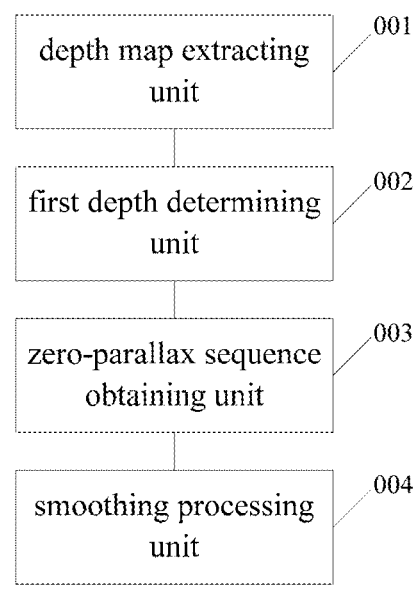
FIG. 16 is a structural schematic illustration of another system for determining parameters of an off-axis virtual camera provided by an embodiment of the present invention.

Based on the embodiment shown in FIG. 15, another system for determining parameters of an off-axis virtual camera provided by an embodiment of the present invention as shown in FIG. 16 can further comprise:

a smoothing processing unit 004, which is used to perform data smoothing processing to the zero-parallax value sequence obtained by the zero-parallax sequence obtaining unit 003 and to obtain a zero-parallax final value sequence constituted by zero-parallax final value zp of each video frame.

Here, the smoothing processing unit 004 can be particularly used to perform data smoothing processing to the zero-parallax value sequence for a preset number of times with a seven-point linear smoothing algorithm, and to obtain the zero-parallax final value sequence constituted by the zero-parallax final value zp of each video frame.

The embodiment as shown in FIG. 16 can make the depth change more smooth by performing data smoothing processing to the zero-parallax value sequence, which avoid the depth jumping problem, and 3D stereoscopic animation filmed with the usage of the zero-parallax final values in the zero-parallax final value sequence obtained by the embodiment as shown in FIG. 16 can enable the users to obtain better watching feeling.

Figure 17:
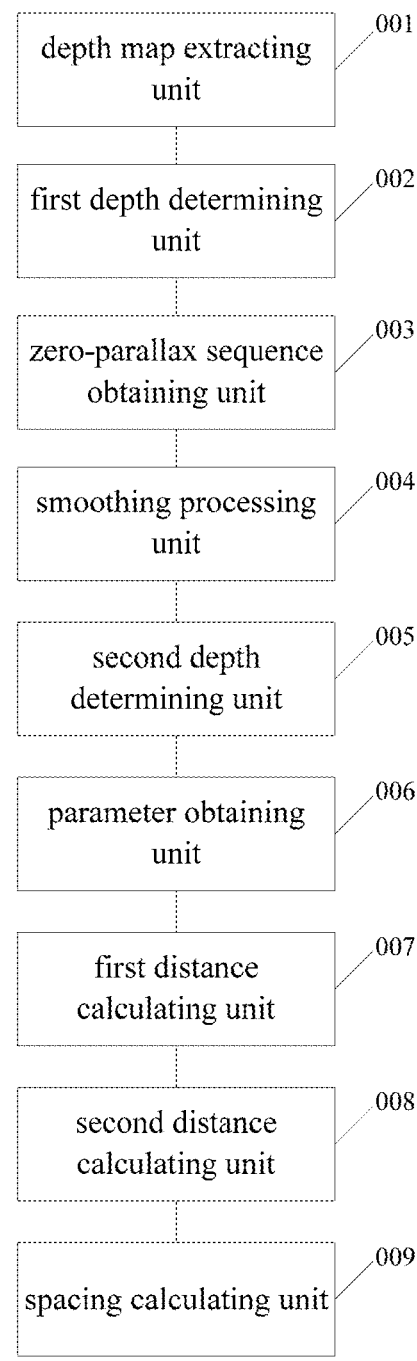
FIG. 17 is a structural schematic illustration of another system for determining parameters of an off-axis virtual camera provided by an embodiment of the present invention.

Based on the embodiment as shown in FIG. 16, another system for determining parameters of an off-axis virtual camera as shown in FIG. 17 can also comprise a second depth determining unit 005, a parameter obtaining unit 006, a first distance calculating unit 007, a second distance calculating unit 008 and a spacing calculating unit 009, wherein the second depth determining unit 005 is used to, for each video frame, determine the minimum depth value in the scene depth map of the video frame as the closest scene depth $Z_{min}$ of the video frame and to determine the maximum depth value in the scene depth map of the video frame as the furthest scene depth $Z_{max}$ of the video frame;

the parameter obtaining unit 006 is used to obtain a pupillary distance pd, a viewing distance vd, the minimum value $\gamma_{min}$ of angle difference and the maximum value $\gamma_{max}$ of angle difference, wherein the angle difference is the difference between a convergence angle and an adjustment angle.

the first distance calculating unit 007 is used to calculate the maximum out-of-screen perceived distance $D_{neg}$ by the equation of $$D_{neg} = vd - \frac{pd}{2\tan\frac{\alpha - \gamma_{min}}{2}}$$

wherein, $$\alpha = 2\tan^{-1}\frac{pd}{2vd};$$

the second distance calculating unit 008 is used to calculate the minimum out-of-screen perceived distance $D_{pos}$ by the equation of $$D_{pos} = \frac{pd}{2\tan\frac{\alpha - \gamma_{max}}{2}} - vd$$

wherein, $$\alpha = 2\tan^{-1}\frac{pd}{2vd};$$

the spacing calculating unit 009 is used to calculate the spacing s between cameras for each video frame by the following equation $$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{z}\right)}$$

wherein, $\delta$ is the pixel width of a video display device, $W_s$ is the pixel width of a stereo image input by a user, and when $\rho_1 \leq \rho_2$ and $\rho_2 \geq 0$, $Z=Z_{min}$ and $D=D_{min}$; when $zp>Z_{max}$, $Z=Z_{min}$ and $D=D_{min}$; When $\rho_1>\rho_2$ and $\rho_2 \geq 0$, $Z=Z_{max}$ and $D=D_{max}$; when $zp<Z_{min}$, $Z=Z_{max}$ and $D=D_{max}$, wherein, $$D_{max} = D_{pos} + vd$$

$$D_{min} = vd - D_{neg}$$

$$\rho_1 = \frac{D_{neg}}{D_{pos}}$$

$$\rho_2 = \frac{zp - Z_{min}}{Z_{max} - zp}.$$

Because the equations for calculating the spacing between cameras in the embodiment as shown in FIG. 17 are obtained according to the mapping relationship of the stereo display comfort interval and perceived depth, the spacing between cameras calculated according to the embodiment as shown in FIG. 17 can allow the scene depth within the comfort interval so that the users can obtain a relatively comfortable watching feeling.

Based on the embodiment shown in FIG. 17, another method for determining parameters of an off-axis virtual camera provided by an embodiment of the present invention can further comprise:

a parameter setting unit, which is used to set the parameters of the off-axis virtual camera according to the zero-parallax final value sequence and the spacing s between cameras for each video frame.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

Various embodiments in the description are all described in a corresponding manner, Reference to each other can be made for the same or similar parts between various embodiments and the description of each embodiment focuses on the differences between them. In particular, the description of the embodiments of a system is quite brief since the embodiments of a system are essentially similar with the embodiments of a method, and reference can be made to the parts in the description of the embodiments of method.

The embodiments described above are just preferable embodiments of the present invention, and are not intended to limit the protection scope of the present invention. Any modifications, alternatives, improvements or the like within the spirit and principle of the present invention are included in the protection scope of the present invention.

What is claimed is:

1. A method for determining parameters of an off-axis virtual camera, characterized in that the method is for applying in a computer and comprises:
    extracting, from a depth buffer, a scene depth map for each video frame in the angle of view at the central point of the off-axis virtual camera;
    for each video frame, determining the minimum value of edge depth values of the scene depth map of the video frame as the closest scene edge depth $Z_b$ of the video frame, and determining the depth of a first object of the video frame as the depth $Z_i$ of an object of interest of the video frame;
    for each video frame, calculating the zero-parallax value $zp_o$ of the video frame by the equation of $zp_o=\min(Z_b,Z_i)$, and obtaining a zero-parallax value sequence constituted by the zero-parallax value $zp_o$ of each video frame;
    performing data smoothing processing to the zero parallax value sequence and obtaining a zero-parallax final value sequence constituted by zero-parallax final value zp of each video frame;
    for each video frame, determining the minimum depth value in the scene depth map of the video frame as the closest scene depth $Z_{min}$ of the video frame, and determining the maximum depth value in the scene depth map of the video frame as the furthest scene depth $Z_{max}$ of the video frame;
    obtaining a pupillary distance pd, a viewing distance vd, the minimum value $\gamma_{min}$ of angle difference, and the maximum value $\gamma_{max}$ of angle difference, wherein the angle difference is the difference between a convergence angle and an adjustment angle;
    calculating the maximum out-of-screen perceived distance $D_{neg}$ by the equation of $$D_{neg} = vd - \frac{pd}{2\tan\frac{\alpha-\gamma_{min}}{2}},$$

wherein, $\alpha = 2\tan^{-1}\frac{pd}{2vd}$;

calculating the minimum out-of-screen perceived distance $D_{pos}$ by the equation of $$D_{pos} = \frac{pd}{2\tan\frac{\alpha-\gamma_{max}}{2}} - vd,$$

wherein, $\alpha = 2\tan^{-1}\frac{pd}{2vd}$;

calculating the spacing s between cameras for each video frame by the equation of $$s = \frac{2 \cdot zp \cdot \tan\frac{\alpha}{2} \cdot pd \cdot \left(1-\frac{vd}{D}\right)}{\delta \cdot W_s \cdot \left(1-\frac{zp}{Z}\right)},$$

wherein, $\delta$ is the pixel width of a video display device, $W_s$ is the pixel width of a stereo image input by a user, and when $\rho_1 \leq \rho_2$ and $\rho_2 \geq 0$, $Z=Z_{min}$ and $D=D_{min}$; when $zp>Z_{max}$, $Z=Z_{min}$ and $D=D_{min}$; when $\rho_1>\rho_2$ and $\rho_2 \geq 0$, $Z=Z_{max}$ and $D=D_{max}$; when $zp<Z_{min}$, $Z=Z_{max}$ and $D=D_{max}$, wherein, $D_{max} = D_{pos} + vd$ $D_{min} = vd - D_{neg}$ $\rho_1 = \frac{D_{neg}}{D_{pos}}$ $\rho_2 = \frac{zp - Z_{min}}{Z_{max} - zp}$.

2. The method according to claim 1, characterized in that the performing data smoothing processing to the zero-parallax value sequence and obtaining a zero-parallax final value sequence constituted by zero-parallax final value zp of each video frame comprises:
    performing data smoothing processing to the zero-parallax value sequence for a preset number of times with a seven-point linear smoothing algorithm, and obtaining the zero-parallax final value sequence constituted by the zero-parallax final value zp of each video frame.

3. The method according to claim 1, characterized in that it further comprises:
    setting the parameters of the off-axis virtual camera according to the zero-parallax final value sequence and the spacing s between cameras for each video frame.

4. A non-transitory computer readable medium comprising executable instructions that, in response to execution by a computer comprising a processor, perform operations comprising:
    extracting, from a depth buffer, a scene depth map for each video frame in the angle of view at the central point of the off-axis virtual camera;
    for each video frame, determining the minimum value of edge depth values of the scene depth map of the video frame as the closest scene edge depth $Z_b$ of the video frame, and determining the depth of a first object of the video frame as the depth $Z_i$ of an object of interest of the video frame;
    for each video frame, calculating the zero-parallax value $zp_o$ of the video frame by the equation of $zp_o=\min(Z_b,Z_i)$, and obtaining a zero-parallax value sequence constituted by the zero-parallax value $zp_o$ of each video frame;
    performing data smoothing processing to the zero-parallax value sequence and obtaining a zero-parallax final value sequence constituted by zero-parallax final value zp of each video frame;
    for each video frame, determining the minimum depth value in the scene depth map of the video frame as the closest scene depth $Z_{min}$ of the video frame and determining the maximum depth value in the scene depth map of the video frame as the furthest scene depth $Z_{max}$ of the video frame;
    obtaining a pupillary distance pd, a viewing distance vd, the minimum value $\gamma_{min}$ of angle difference, and the maximum value $\gamma_{max}$ of angle difference, wherein the angle difference is the difference between a convergence angle and an adjustment angle;

calculating the maximum out-of-screen perceived distance $D_{neg}$ by the equation of $$D_{neg} = vd - \frac{pd}{2\tan\frac{\alpha - \gamma_{min}}{2}},$$

wherein, $$\alpha = 2\tan^{-1}\frac{pd}{2vd};$$

calculating the minimum out-of-screen perceived distance $D_{pos}$ by the equation of $$D_{pos} = \frac{pd}{2\tan\frac{\alpha - \gamma_{max}}{2}} - vd,$$

wherein, $$\alpha = 2\tan^{-1}\frac{pd}{2vd};$$

calculating the spacing s between cameras for each video frame by the equation of $$s = \frac{2 \cdot zp \cdot \tan\frac{\alpha}{2} \cdot pd \cdot \left(1 - \frac{vd}{D}\right)}{\delta \cdot W_s \cdot \left(1 - \frac{zp}{Z}\right)},$$

wherein, $\delta$ is the pixel width of a video display device, $W_s$ is the pixel width of a stereo image input by a user, and when $\rho_1 \leq \rho_2$ and $\rho_2 \geq 0$, $Z=Z_{min}$ and $D=D_{min}$; when $zp > Z_{max}$, $Z=Z_{min}$ and $D=D_{min}$; when $\rho_1 > \rho_2$ and $\rho_2 \geq 0$, $Z=Z_{max}$ and $D=D_{max}$; when $zp < Z_{min}$, $Z=Z_{max}$ and $D=D_{max}$, wherein, $$D_{max} = D_{pos} + vd$$

$$D_{min} = vd - D_{neg}$$

$$\rho_1 = \frac{D_{neg}}{D_{pos}}$$

$$\rho_2 = \frac{zp - Z_{min}}{Z_{max} - zp}.$$

5. The non-transitory computer readable medium according to claim 4, characterized in that the performing data smoothing processing to the zero-parallax value sequence and obtaining a zero-parallax final value sequence constituted by zero-parallax final value zp of each video frame comprises:
   performing data smoothing processing to the zero-parallax value sequence for a preset number of times with a seven-point linear smoothing algorithm, and to obtain the zero-parallax final value sequence constituted by the zero-parallax final value zp of each video frame.

6. The non-transitory computer readable medium according to claim 4, characterized in that the executable instructions, in response to execution, cause the device comprising a processor to perform further operations, comprising:
   setting the parameters of the off-axis virtual camera according to the zero-parallax final value sequence and the spacing s between cameras for each video frame.

* * * * *